United States Patent Office 3,558,606
Patented Jan. 26, 1971

3,558,606
TETRAHYDROBENZOTHIENODIAZEPINONE COMPOUNDS
Francis J. Tinney, Ann Arbor, Mich., assignor to Parke, Davis & Company, Detroit, Mich., a corporation of Michigan
No Drawing. Original application Feb. 6, 1969, Ser. No. 797,274. Divided and this application Sept. 2, 1969, Ser. No. 854,790
Int. Cl. C07d 53/02, 63/18
U.S. Cl. 260—239.3          5 Claims

ABSTRACT OF THE DISCLOSURE

Tetrahydrobenzothienodiazepinone compounds having the formula

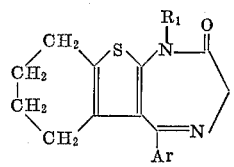

and salts thereof; where $R_1$ is hydrogen or methyl, and Ar is phenyl, o-fluorophenyl, o-chlorophenyl, or 2-thienyl; and their production by (a) reacting a 3-aroyl-2-(2-haloacetamido)tetrahydrobenzothiophene or a salt thereof with ammonia, (b) reacting a 3-aroyl-2-(2-phthalimidoacetamido)tetrahydrobenzothiophene with anhydrous hydrazine, (c) reacting a 2-(2-aminoacetamido)-3-aroyltetrahydrobenzothiophene salt with a base, and (d) reacting one of the tetrahydrobenzothienodiazepinone compounds wherein $R_1$ is hydrogen with a methylating agent in the presence of a base. The compounds of the invention are useful as anticonvulsant and anti-anxiety agents.

CROSS REFERENCE TO RELATED APPLICATION

This application is a division of co-pending application Ser. No. 797,274, filed Feb. 6, 1969, now abandoned.

SUMMARY AND DETAILED DESCRIPTION

The present invention relates to new heterocylic nitrogen compounds that are useful as pharmacological agents and to methods for their production. More particularly, the invention relates to new tetrahydrobenzothienodiazepinone compounds having the formula

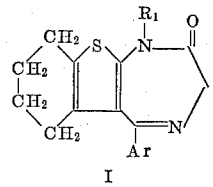

and to pharmaceutically-acceptable salts thereof; where $R_1$ is hydrogen or methyl, and Ar is phenyl, o-fluorophenyl, o-chlorophenyl, or 2-thienyl.

In accordance with the invention, tetrahydrobenzothienodiazepinone compounds having Formula I above are produced by reacting a 3-aroyl-2-(2-haloacetamido)tetrahydrobenzothiophene compound having the formula

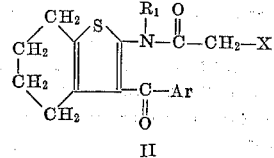

or a salt thereof, with ammonia; where each of $R_1$ and Ar has the same meaning as previously given and X is bromine, chlorine, or iodine, and preferably bromine. The reaction is best carried out in an unreactive solvent medium. Suitable solvents include lower alkanols, such as methanol ethanol, and 2-propanol; tertiary amides, such as N,N-dimethylacetamide and N-methyl-2-pyrrolidinone; ethers, such as dioxane, tetrahydrofuran, and 1,2-dimethoxyethane; and halogenated hydrocarbons, such as methylenechloride, chloroform, and carbon tetrachloride; as well as mixtures of these. Excess liquid anhydrous ammonia can also be used as a solvent. A preferred solvent is a mixture of methanol and ether. The temperature of the reaction is not critical and may be varied from —40 to 100° C., with a temperature in the range from 15 to 30° C. being preferred. The duration of the reaction is likewise not critical, and at a temperature in the preferred range, the reaction is essentially complete after about 12–20 hours. For best results, a large excess of ammonia is employed.

The 3-aroyl-2(2-haloacetamido)tetrahydrobenzothiophenes and salts thereof that are used as starting materials in the foregoing process are prepared by reacting a 2-amino-3-aroyl-tetrahydrobenzothiophene compound having the formula

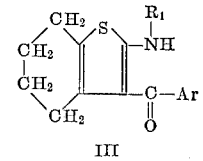

with a haloacetyl compound having the formula

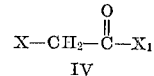

where X is as defined earlier and $X_1$ is bromine or chlorine.

The 2-amino-3-aroyltetrahydrobenzothiophene compounds having Formula III above are in turn prepared by a variety of methods as described in greater detail hereinafter. For example, 2-amino-3-(o-fluorobenzoyl)-4,5,6,7-tetrahydrobenzo[b]thiophene is prepared by first reacting methyl o-fluorobenzoate with acetonitrile in the presence of sodamide in liquid ammonia to give (o-fluorobenzoyl)acetonitrile, then further reacting this intermediate with cyclohexanone in the presence of β-alanine in a mixture of acetic acid and benzene to give α-(o-fluorobenzoyl)-$\Delta^{1,\alpha}$-cyclohexaneacetonitrile, which is finally reacted with sulfur and diethylamine in a lower alkanol solvent to give the desired 2-amino-3-(o-fluorobenzoyl)-4,5,6,7-tetrahydrobenzo[b]thiophene.

The 3-aroyl-2-(N-methylamino)tetrahydrobenzothiophene compounds, that is, the compounds having Formula III above where $R_1$ is methyl, are obtained as follows. A 2-amino-3-aroyltetrahydrobenzothiophene compound having Formula III where $R_1$ is hydrogen is reacted with p-toluenesulfonyl chloride to give the corresponding 3-aroyl - 2 - (p - toluenesulfonamido)tetrahydrobenzothiophene, and this intermediate is then reacted with a methylating agent in the presence of a base to give the corresponding 3 - aroyl - 2 - (N - methyl - p - toluenesulfonamido)tetrahydrobenzothiophene intermediate having the formula

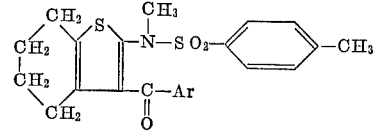

which is reacted with sodium naphthalide in an ethereal solvent to remove the p-toluenesulfonyl group and give the desired 3-aroyl-2-(N-methylamino)tetrahydrobenzothiophene starting material.

Also in accordance with the invention, tetrahydrobenzothienodiazepinone compounds having Formula I above are produced by reacting a 3-aroyl-2-(2-phthalimidoacetamido)tetrahydrobenzothiophene compound having the formula

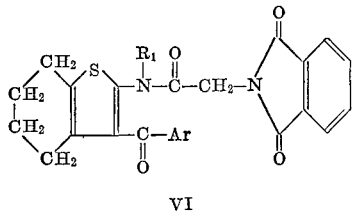

VI with anhydrous hydrazine; where each of $R_1$ and Ar is as defined previously. The reaction is preferably carried out in an unreactive solvent medium. Solvents that may be used include lower alkanols, such as methanol, ethanol, and 2-propanol; ethers, such as dioxane, tetrahydrofuran, and diethylene glycol dimethyl ether; tertiary amides, such as N,N-dimethylformamide, N,N-dimethylacetamide, and N-methyl-2-pyrrolidinone; acetonitrile; and dimethylsulfoxide; as well as mixtures of these. A preferred solvent is a lower alkanol. Neither the temperature nor the duration of the reaction is critical, and both may be varied over a wide range, the temperature from about 20 to about 150° C. and the duration from 30 minutes to 48 hours. A preferred temperature is one between about 50 and about 80° C., and at such a temperature, the reaction is essentially complete after a period of about one to 5 hours. While equivalent quantities of reactants may be employed, best results are obtained when at least 2 moles of hydrazine are used per mole of the 3-aroyl-2-(2-phthalimidoacetamido)tetrahydrobenzothiophene reactant. During the course of the reaction, phthalhydrazide is formed as an insoluble secondary product and is best removed prior to isolation of the desired tetrahydrobenzothienodiazepinone product.

The 3-aroyl-2-(2-phthalimidoacetamido)tetrahydrobenzothiophene starting materials are obtained by reacting a 2-amino-3-aroyltetrahydrobenzothiophene compound having Formula III above with phthalimidoacetyl chloride in the presence of pyridine in an unreactive solvent such as dichloromethane.

Further in accordance with the invention, tetrahydrobenzothienodiazepinone compounds having Formula I above are produced by reacting a 2-(2-aminoacetamido)-3-aroyltetrahydrobenzothiophene salt compound having the formula

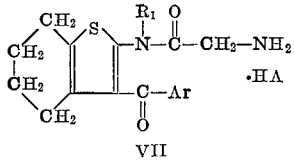

VII with a sufficient amount of base to neutralize the salt, whereupon the free base 2-(2-aminoacetamido)-3-aroyltetrahydrobenzothiophene that is liberated undergoes cyclization to give a tetrahydrobenzothienodiazepinone compound of the invention; where $R_1$ and Ar have the aforementioned significance and A represents one equivalent of an anion. The reaction is best carried out in a solvent medium, which may be water or an aqueous lower alkanol. Any of a number of bases may be used including alkali metal carbonates and bicarbonates, such as sodium carbonate, potassium carbonate, and sodium bicarbonate; alkali metal hydroxides, such as sodium hydroxide and potassium hydroxide; and alkaline earth metal hydroxides, such as magnesium hydroxide. The preferred base is an aqueous alkali metal hydroxide. The temperature is not critical, and the reaction can conveniently be carried out at room temperature, that is, without external heating or cooling. The duration of the reaction is likewise not critical but is dependent to a certain extent on the amount of base employed. Rapid reaction and best results are obtained when the reaction mixture is made strongly basic (pH 10–12).

The 2-(2-aminoacetamido)-3-aroyltetrahydrobenzothiophene salt compounds required as starting materials in the foregoing process are prepared in a number of ways. For example, the hydrobromide salts, which are the preferred starting materials, are prepared by reacting a 2-amino-3-aroyltetrahydrobenzothiophene compound having Formula III above with N-(carbobenzoxy)glycine in the presence of N,N'-dicyclohexylcarbodiimide to give a 3 - aroyl - 2 - [2-(carbobenzoxyamino)-acetamido]tetrahydrobenzothiophene compound having the formula

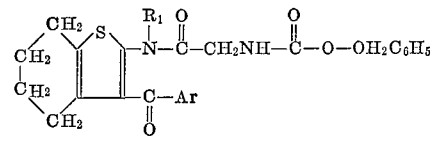

VIII which is then reacted with hydrogen bromide in acetic acid to give the desired hydrobromide salt starting material (Formula VII, A=Br). Other salts, if desired, can then be obtained from the hydrobromide by anion exchange on a suitable ion exchange resin.

The 2-(2-aminoacetamido)-3-aroyltetrahydrobenzothiophene hydrochlorides can also be prepared by reacting a 3 - aroyl - 2 - (azidoacetamido)tetrahydrobenzothiophene compound having the formula

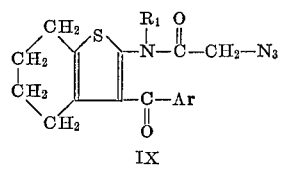

IX with stannous chloride and hydrochloric acid in an unreactive solvent medium, such as tetrahydrofuran. When prepared in this way, it is most convenient to react the hydrochloride salt starting material obtained directly with a base as described above without isolation.

Still further in accordance with the invention, tetrahydrobenzothienodiazepinone compounds having the formula

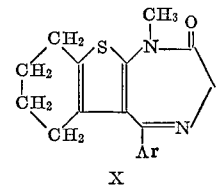

X are produced by reacting a tetrahydrobenzothienodiazepinone compound having the formula

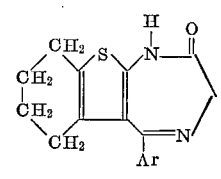

XI with a methylating agent in the presence of a base; where Ar has the same meaning as previously given. Examples of methylating agents that may be used are a methyl halide, especially methyl iodide, methyl sulfate, and a methyl hydrocarbon sulfonate, such as methyl methanesulfonate and methyl p-toluenesulfonate. Bases that may be used include alkali metal hydrides, such as sodium hydride and lithium hydride, alkali metal amides, such as sodamide and potassium amide, and alkali metal alkoxides. Of these, sodium hydride is preferred. The reaction is best carried out in an unreactive solvent medium, which may be a tertiary amide, such as N,N-dimethylformamide, N,N-dimethylacetamide, and N-methyl-2-pyrrolidinone; an ether, such as diethyl ether, tetrahydrofuran, and dioxane; an aromatic hydrocarbon, such as benzene and toluene; dimethylsulfoxide; and mixtures of these. Preferred solvents are N,N-dimethylformamide and dimethylsulfoxide. The temperature and duration of the reaction are not critical and may be varied widely, the temperature from 0 to 100° C. and the duration from one to about 48 hours. The reaction can conveniently be carried out at room temperature, that is, without external heating or cooling and at that temperature is essentially complete after about one to 4 hours, but may optionally be continued for up to 16 hours to insure completeness. Equimolar quantities of reactants and base may be employed, although a slight excess of any one is not harmful. For optimum yields, it is desirable to use a slight excess of both the methylating agent and base.

The compounds of the invention can exist in the free form having Formula I above or in the form of an acid-addition salt. Pharmaceutically-acceptable acid-addition salts are formed by reaction of the free tetrahydrobenzothienodiazepinone compounds with any of a number of inorganic acids, including hydrochloric, hydrobromic hydriodic, nitric, sulfuric, and phosphoric, and with certain strong organic acids, such as methanesulfonic, benzenesulfonic, and p-toluenesulfonic.

The free tetrahydrobenzothienodiazepinone compounds of Formula I where $R_1$ is hydrogen also form pharmaceutically-acceptable salts by reaction with a strong base. Suitable strong bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides.

The free tetrahydrobenzothienodiazepinone compounds and their salts may differ somewhat in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., A.M.A. Archives of Neurology and Psychiatry, vol. 66, pp. 329–337 (1951), and vol. 68, pp. 498–505 (1952), and by Chen et al., Journal of Pharmacology and Experimental Therapeutics, vol. 103, pp. 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained for some representative compounds of the present invention when tested by the foregoing procedure are shown in the following table. The compounds in the table are identified by reference to the examples that follow, where the preparation of each is described.

ANTICONVULSANT ACTIVITY

| Compound | Dose, mg./kg. | Rating |
|---|---|---|
| Example 1 | 250 | 4+ |
|  | 125 | 4+ |
|  | 63 | 4+ |
|  | 32 | 1–2+ |
|  | 16 | 2–3+ |
|  | 8 | 0 |
| Example 2 | 250 | 4+ |
|  | 125 | 4+ |
|  | 63 | 3–4+ |
|  | 32 | 0 |
| Example 3 | 250 | 4+ |
|  | 125 | 4+ |
|  | 63 | 4+ |
|  | 32 | 4+ |
|  | 16 | 3–4+ |
|  | 8 | 0 |

The anti-anxiety activity of the compounds of the invention is determined in a test that measures food consumption by rats that have been placed in a anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methocel, by oral intubation and is immediately placed in an individual metabolism cage. A 30-minute period is allowed for absorption of the test compound. Each animal is then given access to a milk preparation in a graduated and calibrated tube. The preparation consists of one part sweetened condensed milk and two parts water. The total milk intake of each animal after one and 2 hours is recorded and compared with that of a group of 8 untreated control animals. The animals are also observed for any gross behavorial signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities of some representative compounds of the present invention, as determined by the foregoing procedure, are shown in the following table, where the compounds again are identified by reference to the examples that follow. The table also shows the results obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | Dose, mg./kg. | Milk intake after 1 hour, ml. |
|---|---|---|
| Example 1 | 40 | 10.5 |
|  | 20 | 11.6 |
|  | 10 | 7.7 |
|  | 5 | 7.6 |
|  | 2.5 | 7.8 |
|  | 1.25 | 5.9 |
|  | 0.625 | 2.9 |
| Example 2 | 40 | 7.7 |
|  | 20 | 6.7 |
|  | 10 | 6.9 |
|  | 5 | 6.3 |
|  | 2.5 | 5.3 |
|  | 1.25 | 4.6 |
| Example 3 | 40 | 7.8 |
|  | 20 | 9.6 |
|  | 10 | 8.8 |
|  | 5 | 7.6 |
|  | 2.5 | 9.3 |
|  | 1.25 | 7.3 |
|  | 0.625 | 4.0 |
| Diazepam | 40 | 10.7 |
|  | 20 | 12.1 |
|  | 10 | 7.4 |
|  | 5 | 7.1 |
|  | 2.5 | 8.0 |
| Chlordiazepoxide | 40 | 10.7 |
|  | 20 | 11.4 |
|  | 10 | 8.1 |
|  | 5 | 4.7 |

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solutions.

The invention is illustrated by the following examples.

Example 1

To a mixture of 24.0 g. of 3-benzoyl-2-(2-bromoacetamido) - 4,5,6,7 - tetrahydrobenzo[b]thiophene in 650 ml. of ether is added a solution of 40 g. of ammonia in 500 ml. of methanol, and the resulting solution is stirred at room temperature for about 18 hours and is then evaporated under reduced pressure to give a residue of 6,7,8,9-tetrahydro - 5 - phenyl - 1H - [1]benzothieno[2,3 - e] [1,4]diazepin-2(3H)-one, which is isolated, washed well with water, and purified by crystallization from acetonitrile; M.P. 249–250° C.

The free base product (1.0 g.) is dissolved in 150 ml. of 2-propanol, and the resulting solution is treated dropwise with a slight excess of a saturated hydrogen chloride in 2-propanol solution. Ether is then added until precipitation is complete, and the 6,7,8,9-tetrahydro-5-phenyl-1H-[1]benzothieno[2,3 - e][1,4]diazepin - 2(3H) - one, monohydrochloride that precipitates is isolated; M.P. 240–242° C., following crystallization from 2-propanol-ether.

Example 2

A solution of 240 g. of ammonia in 3.0 liters of methanol is added to a mixture of 138 g. of 2-(2-bromoacetamido) - 4,5,6,7 - tetrahydro - 3 - (2 - thenoyl)benzo[b]thiophene in 4.0 liters of ether, and the resulting solution is stirred at room temperature for about 18 hours. It is then evaporated to dryness under reduced pressure, and the residue of 6,7,8,9 - tetrahydro - 5 - (2 - thienyl) - 1H-[1]benzothieno[2,3 - e][1,4]diazepin - 2(3H) - one that is obtained is isolated, washed with water, and purified by crystallization from acetonitrile; M.P. 252–254° C.

Example 3

To a mixture of 40 g. of 2-(2-bromoacetamido)-3-(o-fluorobenzoyl) - 4,5,6,7-tetrahydrobenzo[b]thiophene and 1000 ml. of ether is added a solution of 40 g. of ammonia in 500 ml. of methanol, and the resulting solution is stirred at room temperature for about 18 hours and then evaporated under reduced pressure to give a residue of 5 - (o-fluorophenyl)-6,7,8,9-tetrahydro-1H-[1]benzothieno[2,3-e][1,4]diazepin-2(3H)-one, which is isolated, washed with water, and purified by crystallization from acetonitrile; M.P. 234–236° C.

Example 4

To a suspension of 82 g. of 3-benzoyl-4,5,6,7-tetrahydro - 2-(2-phthalimidoacetamido)benzo[b]thiophene in 600 ml. of methanol is added 12 g. of anhydrous hydrazine, and the resulting mixture is stirred and heated under reflux for 3 hours. It is then acidified with concentrated hydrochloric acid, and the acidified mixture is cooled and filtered to remove the precipitated unwanted by-product, phthalhydrazide. The filtrate is made basic with concentrated aqueous ammonia, the basic mixture is evaporated under reduced pressure, and the residue obtained is extracted with hot acetonitrile. The acetonitrile extract is then filtered, and the filtrate is cooled to give a crystalline precipitate of 6,7,8,9 - tetrahydro-5-phenyl-1H-[1]benzothieno[2,3-e][1,4]diazepin-2(3H)-one, which is isolated, washed with water, and dried; M.P. 249–250° C., following crystallization from acetonitrile.

The free base product obtained above (2.5 g.) is dissolved in 15 ml. of 5% ethanolic hydrogen chloride, the resulting solution is cooled to 0° C., and the 6,7,8,9-tetrahydro - 5-phenyl-1H-[1]benzothieno[2,3-e][1,4]diazepin-2(3H)-one, monohydrochloride that precipitates is isolated and dried.

Example 5

Utilizing the procedure described in Example 4 above, from the reaction of 82 g. of 3-(o-chlorobenzoyl)-4,5,6,7-tetrahydro - 2 - (2-phthalimidoacetamido)benzo[b]thiophene with 11 g. of anhydrous hydrazine in 500 ml. of methanol, there is obtained 5-(o-chlorophenyl)-6,7,8,9-tetrahydro - 1H - [1]-benzothieno[2,3-e][1,4]diazepin-2 (3H)-one; M.P. 267–269° C., following crystallization from aqueous ethanol.

The sodium salt of the above product is obtained as follows. 5 - (o-chlorophenyl)-6,7,8,9-tetrahydro-1H-[1] benzothieno[2,3-e][1,4]diazepin-2(3H)-one (6.6 g.) is stirred with 40 ml. of 0.5 N sodium hydroxide, the resulting mixture is filtered, and the filtrate is lyophilized. The solid residue obtained is dissolved in 25 ml. of hot N,N-dimethylformamide, and the solution is filtered, cooled, and treated with about 100 ml. of ether to precipitate 5-(o-chlorophenyl)-6,7,8,9-tetrahydro-1H-[1]benzothieno[2,3-e][1,4]diazepin-2(3H)-one, sodium salt, which is isolated, washed with ether, and dried.

Example 6

A solution of 10 g. of 2-(2-amino-N-methylacetamido)-3 - benzoyl-4,5,6,7-tetrahydrobenzo[b]thiophene hydrobromide in 100 ml. of water at room temperature is made strongly alkaline by the addition of 50% aqueous sodium hydroxide, and the resulting mixture is extracted several times with dichloromethane. The combined extracts are washed with water, dried, and evaporated under reduced pressure to give 6,7,8,9-tetrahydro-1-methyl-5-phenyl-1H-[1]benzothienol[2,3-e][1,4] - diazepin-2(3H)-one; M.P. 129–131° C., following crystallization from hexane.

The free base product (2.5 g.) is dissolved in 20 ml. of 5% ethanolic hydrogen chloride, the resulting solution is cooled to 0° C., and the 6,7,8,9-tetrahydro-1-methyl-5-phenyl - 1H - [1]benzothieno[2,3-e][1,4]diazepin-2(3H)-one, monohydrochloride that precipitates is isolated, washed with ether, and dried.

Example 7

To a stirred solution of 42 g. of stannous chloride dihydrate in 100 ml. of concentrated hydrochloric acid at 5–10° C. is added in portions 32 g. of 3-benzoyl-2-(2-azidoacetamido) - 4,5,6,7 - tetrahydrozenzo[b]thiophene. When addition is complete, 100 ml. of tetrahydrofuran is added, and the resulting mixture is stirred and heated at 60° C. until the nitrogen evolution ceases. The mixture, which contains 3-benzoyl-2-(2-aminoacetamido)-4,5,6,7-tetrahydrobenzo[b]-thiophene hydrochloride, is then cooled and diluted with an equal volume of water, and the aqueous mixture is extracted with dichloromethane. The extract is washed twice with dilute aqueous sodium hydroxide, dried, treated with charcoal, filtered, and evaporated to dryness. The residue obtained is extracted with dilute hydrochloric acid, and the acidic extract is made basic with excess aqueous ammonia to precipitate a gummy solid, which is isolated and crystallized from acetonitrile. It is 6,7,8,9-tetrahydro-5-phenyl-1H-[1]-benzothieno[2,3-e][1,4]diazepin-2(3H)-one; M.P. 249–250° C.

The sodium salt of the foregoing product is obtained as follows. 6,7,8,9 - tetrahydro-5-phenyl-1H-[1]benzothieno-[2,3-e][1,4]diazepin-2(3H)-one (5.9 g.) is stirred with 40 ml. of 0.5 N sodium hydroxide, the resulting mixture is filtered, and the filtrate is lyophilized. The solid residue obtained is dissolved in 30 ml. of hot N,N-dimethylformamide, and the solution is filtered, cooled, and treated with about 100 ml. of ether to precipitate 6,7,8,9 - tetrahydro-5-phenyl-1H-[1]benzothieno[2,3-e][1,4] diazepin-2(3H)-one, sodium salt, which is isolated, washed with ether, and dried.

Example 8

To a stirred solution of 5.0 g. of 6,7,8,9-tetrahydro-5 - phenyl - 1H - [1]benzothieno[2,3-e][1,4]diazepin-2 (3H)-one in 200 ml. of N,N-dimethylformamide is added in portions 0.78 g. of 60.2% sodium hydride in mineral oil dispersion. The resulting suspension is cooled to 10° C., 2.8 g. of methyl iodide is added dropwise, and the mixture obtained is stirred at room temperature for about 45 minutes. It is then evaporated under reduced pressure, the residue obtained is dissolved in 100 ml. of dichloromethane, and the resulting solution is washed with two 100-ml. portions of water, dried, and evaporated under reduced pressure to give 6,7,8,9-tetrahydro-1-methyl - 5 - phenyl-1H-[1]benzothieno[2,3-e][1,4]-diazepin-2(3H)-one, which is isolated and purified by crystallization from hexane; M.P. 129–131° C.

STARTING MATERIALS

The various starting materials employed in the foregoing examples and intermediates required for their preparation are obtained by the methods described in the following.

(A) 2-amino-3-aroyltetrahydrobenzothiophenes (1) 2-amino-4,5,6,7-tetrahydro-3 - (2 - thenoyl)benzo-[b]thiophene.—(a) A mixture consisting of 189 g. of (2-thenoyl)acetonitrile, 135 g. of cyclohexanone, 10.5 g. of β-alanine, 150 ml. of acetic acid, and 1,000 ml. of benzene is heated under reflux under a water separator for 7 hours. Upon cooling, the resulting solution is washed with three 250-ml. portions of water, dried, and evaporated under reduced pressure to give an oily residue of α - (2-thenoyl)$\Delta^{1,\alpha}$-cyclohexaneacetonitrile, which is purified by distillation under reduced pressure; B.P. 154–155° C./1 mm. Hg.

(b) To a stirred suspension of 235 g. of the above intermediate and 32.6 g. of sulfur in 500 ml. of ethanol is added dropwise 45 ml. of diethylamine. During the addition, the temperature of the reaction mixture rises to about 65° C. The mixture is then stirred for one hour, cooled, and diluted with 125 ml. of water. The solid 2-amino-4,5,6,7 - tetrahydro - 3 - (2 - thenoyl)benzo[b]thiophene that precipitates is isolated, washed with water, and dried; M.P. 131–133° C., following crystallization from toluene.

(2) 2 - amino - 3 - (o - fluorobenzoyl)-4,5,6,7-tetrahydrobenzo[b]thiophene.—A solution of 106.6 g. of acetonitrile in 100 ml. of ether is added over a period of 10 minutes to a stirred suspension of sodamide in liquid ammonia (prepared by dissolving 60 g. of sodium in 2.5 lters of liquid ammonia), cooled to −50° C. The resulting mixture is stirred for 10 minutes at −50° C., a solution of 205 g. methyl o-fluorobenzoate in 200 ml. of ether is added, and stirring is continued for one hour, during which time the reaction mixture is allowed to warm to room temperature. The mixture is then evaporated under reduced pressure, and the residue obtained is mixed with 2.3 liters of ether. The ethereal mixture is poured into 2 liters of ice water, the aqueous mixture obtained is filtered, and the aqueous phase is separated and acidified to pH 5 with 20% hydrochloric acid. The solid that precipitates under acidification is isolated and dissolved in ether. The ethereal solution is washed with water, dried, treated with charcoal, filtered, and evaporated under reduced pressure to give (o-fluorobenzoyl)acetonitrile; M.P. 50–55° C., following crystallization from petroleum ether. This intermediate product (196 g.) is reacted with 130 g. of cyclohexanone and 10.5 g. of β-alanine in a mixture of 150 ml. of acetic acid and 1,000 ml. of benzene utilizing the procedure described in (1)(a) above to give α-(o-fluorobenzoyl) - $\Delta^{1,\alpha}$ - cyclohexaneacetonitrile; B.P. 145–162° C./0.35–0.90 mm. Hg. This second intermediate product (207 g.) is in turn reacted with 27.5 g. of sulfur and 212 ml. of diethylamine in 500 ml. of ethanol according to the procedure of (1)(b) above to give the desired 2 - amino - 3 - (o - fluorobenzoyl)4,5,6,7-tetrahydrobenzo[b]thiophene; M.P. 176–179° C., following crystallization from toluene-petroleum ether.

(3) 2 - amino - 3 - (o-chlorobenzoyl)4,5,6,7,-tetrahydrobenzo[b]thiophene.—α - (o - chlorobenzoyl)-$\Delta^{1,\alpha}$-cyclohexanoneacetonitrile, suitable for use without final distillation, is first prepared from 297 g. of (o-chlorobenzoyl)acetonitrile, 180 g. of cyclohexanone, 15 g. of β-alanine, and 200 ml. of acetic acid in 1,500 ml. of benzene utilizing the procedure described in (1)(a) above, and it (430 g.) is then reacted with 53 g. of sulfur and 375 ml. of diethylamine in 700 ml. of ethanol according to the procedure of (1)(b) above to give the desired 2-amino-3-(o - chlorobenzoyl) - 4,5,6,7 - tetrahydrobenzo[b]thiophene; M.P. 145–149° C., following crystallization from acetonitrile.

(B) 3-aroyl-2-(2-haloacetamido)tetrahydrobenzothiophenes (1) 3-benzoyl - 2 - (2-bromoacetamido)-4,5,6,7-tetrahydrobenzo[b]thiophene.—To a stirred solution of 23 g. of 2-amino - 3-benzoyl-4,5,6,7 - tetrahydrobenzo[b]thiophene (for the preparation of this and related compounds see Chemische Berichte, vol. 98, pages 3571–3577, 1965) and 7.1 g. of pyridine in 1,000 ml. of ether is added dropwise 21.6 g. of bromoacetyl bromide, and the resulting mixture is stirred at room temperature for 3 hours. It is then treated with about 150 ml. of water, and the organic phase is separated, washed with two 200-ml. portions of water, dried, and evaporated to give the desired 3-benzoyl-2 - (2 - bromoacetamido) - 4,5,6,7-tetrahydrobenzo[b] thiophene; M.P. 109–111° C., following crystallization from methanol.

(2) 2 - (2 - bromoacetamido) - 4,5,6,7-tetrahydro-3-(2 - thenoyl)benzo[b]thiophene, M.P. 154–155° C., following crystallization from toluene; obtained from 196 g. of 2-amino - 4,5,6,7-tetrahydro-3-(2-thenoyl)benzo[b] thiophene, 182 g. of bromoacetyl bromide, and 59 g. of pyridine in 2.0 liters of ether utilizing the procedure of (1) above.

(3) 2-(2-bromoacetamido)-3-(o-fluorobenzoyl)-4,5,6,-7-tetrahydrobenzo[b]thiophene, M.P. 133–136° C., following crystallization from toluene-petroleum ether; obtained from 91 g. of 2-amino-3-(o-fluorobenzoyl)-4,5,6,7-tetrahydrobenzo[b]-thiophene, 80 g. of bromoacetyl bromide, and 26.5 g. of pyridine in 1,500 ml. of ether by the procedure of (1) above.

(C) 3-aroyl-2-(2-phthalimidoacetamido)tetrahydro-benzothiophenes (1) 3 - benzoyl - 4,5,6,7-tetrahydro-2-(2-phthalimidoacetamido)benzo[b]thiophene.—To a solution of 51 g. of 2 - amino - 3-benzoyl-4,5,6,7-tetrahydrobenzo[b]thiophene in 500 ml. of dichloromethane at room temperature is first added a solution of 44.8 g. of phthalimidoacetyl chloride in 100 ml. of dichloromethane and then 32 g. of pyridine. The resulting mixture is stirred at room temperature for 16 hours, concentrated under reduced pressure to a volume of about 300 ml., and diluted with an equal volume of ether. Upon cooling the etheral mixture, there is obtained a solid precipitate of the desired 3-benzoyl - 4,5,6 - tetrahydro - 2 - (2 - phthalimidoacetamido)benzo[b]thiophene, which is isolated, washed with water, and dried; M.P. 232–236° C.

(2) 3 - (o - chlorobenzoyl) - 4,5,6,7 - tetrahydro-2-(2-phthalimidoacetamido)benzo[b]thiophene, M.P. 220–231° C.; obtained from 58 g. of 2-amino-3-(o-chlorobenzoyl)-4,5,6,7-tetrahydrobenzo[b]thiophene and 44.8 g. of phthalimidoacetyl chloride in a mixture of 32 g. of pyridine and 600 ml. of dichloromethane according to the procedure described in (1) above.

(D) 2 - (2 - amino - N - methylacetamido) - 3 - benzoyl-4,5,6,7-tetrahydrobenzo[b]thiophene hydrobromide A mixture consisting of 10.1 g. of 2-amino-3-benzoyl-4,5,6,7-tetrahydrobenzo[b]thiophene, 8.5 g. of p-toluenesulfonyl chloride, and 150 ml. of pyridine is stirred and heated under reflux for 90 minutes, cooled, and diluted with 300 ml. of ice water to give a solid precipitate of 3 - benzoyl - 4,5,6,7-tetrahydro-2-(p-toluenesulfonamido)benzo[b]thiophene, which is isolated, washed with water, dried, and used in the next reaction step without further purification.

To a stirred mixture of 2.0 g. of 50% sodium hydride in mineral oil disperson and 30 ml. of N,N-dimethylformamide at 20–25° C. is added in portions 14.5 g. of 3-benzoyl - 4,5,6,7 - tetrahydro - 2 - (p - toluenesulfonamido)-benzo[b]thiophene. The resulting mixture is stirred for 30 minutes, 8.8 g. of dimethyl sulfate is added dropwise, and the reaction mixture is stirred for 2 hours more at 20–25° C. It is then evaporated under reduced pressure, and the residue obtained is extracted with dichloromethane. The dichloromethane solution is washed successively with water, 4% aqueous sodium hydroxide, and saturated aqueous sodium chloride, dried, and evaporated to give 3-benzoyl-4,5,6,7-tetrahydro-2-(N - methyl - p - toluenesulfonamido)benzo[b]thiophene, suitable for use without further purification.

A mixture consisting of 2.3 g. of sodium, 13 g. of naphthalene, and 150 ml. of 1,2-dimethoxyethane is stirred under nitrogen at 20–25° C. for 90 minutes. To the resulting solution is added a solution of 12.8 g. of 3 - benzoyl - 4,5,6,7 - tetrahydro-2-(N-methyl-p-toluenesulfonamido)benzo[b]thiophene in 100 ml. of 1,2-dimethoxyethane, and the reaction mixture is stirred at 20–25° C. for 2 hours. It is then treated carefully with 35 ml. of water and diluted with 250 ml. of ethyl acetate. The organic phase is separated, washed with saturated aqueous sodium chloride, and extracted with 200 ml. of 1 N hydrochloric acid. The acidic extract is next made basic with 30% aqueous sodium hydroxide, and the basic mixture is extracted with ether. The ether extract is washed with water, dried, and evaporated to give 3-benzoyl - 4,5,6,7 - tetrahydro - 2 - (methylamino)benzo[b]thiophene, which can be used in the next reaction without additional purification.

To a solution of 23.3 g. of the foregoing intermediate product in 300 ml. of ethyl acetate is added 15 g. of N-(carbobenzoxy)glycine and 16 g. of N,N'-dicyclohexylcarbodiimide, and the resulting mixture is stirred and heated under reflux for 16 hours. It is then cooled and filtered to remove the precipitated insoluble N,N'-decyclohexylurea by-product, and the filtrate is washed with dilute aqueous sodium bicarbonate and with dilute hydrochloric acid. After drying, it is evaporated under reduced pressure to give 3-benzoyl-2-[2-(carbobenzoxyamino) - N - methylacetamido] - 4,5,6,7 - tetrahydrobenzo[b]thiophene, which can be purified by crystallization from ethyl acetate-petroleum ether.

The foregoing intermediate product (20 g.) is dissolved in 200 ml. of 20% hydrogen bromide in acetic acid, and the resulting solution is kept at 20–25° C. for 2 hours. It is then poured into 1,000 ml. of ether, and the solid 2 - (2 - amino - N - methylacetamido) - 3 - benzoyl-4,5,6,7-tetrahydrobenzo[b]thiophene hydrobromide that precipitates is isolated, washed with water, and dried.

(E) 3-benzoyl-2-(2-azidoacetamido)-4,5,6,7-tetrahydrobenzo[b]thiophene

To a stirred suspension of 18 g. of sodium azide in 100 ml. of dimethyl sulfoxide is added 75 g. of 3-benzoyl-2 - (2 - bromoacetamido) - 4,5,6,7 - tetrahydrobenzo[b]-thiophene, and the resulting mixture is stirred for one hour with the temperature maintained below 40° C. by means of an external cooling bath. It is then poured into 400 ml. of cold water, and the gummy solid that precipitates is isolated. Upon trituration of the gum with ether, there is obtained crystalline 3-benzoyl-2-(2-azidoacetamido) - 4,5,6,7-tetrahydrobenzo[b]thiophene, which is isolated and dried; M.P. 119–124° C.

I claim:
1. A member of the class consisting of tetrahydrobenzothienodiazepinone compounds having the formula

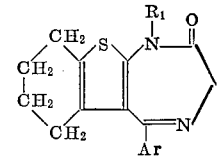

and pharmaceutically-acceptable salts thereof; where $R_1$ is hydrogen or methyl, and Ar is a member of the class consisting of phenyl, o-fluorophenyl, o-chlorophenyl, and 2-thienyl.

2. A compound according to claim 1 which is 6,7,8,9-tetrahydro - 5 - phenyl - 1H - [1]benzothieno[2,3-e]-[1,4]diazepin-2(3H)-one.

3. A compound according to claim 1 which is 6,7,8,9-tetrahydro - 5 - (2 - thienyl) - 1H - [1]benzothieno-[2,3-e][1,4]diazepin-2(3H)-one.

4. A compound according to claim 1 which is 5-(o-fluorophenyl) - 6,7,8,9 - tetrahydro - 1H - [1]benzothieno[2,3-e][1,4]diazepin-2(3H)-one.

5. A compound according to claim 1 which is 6,7,8,9-tetrahydro - 1 - methyl - 5 - phenyl - 1H - [1]benzothieno[2,3-e][1,4]diazepin-2(3H)-one.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.

260—332.2, 332.3 326, 349; 424—275